[12] United States Patent  
Beutler et al.

(10) Patent No.: US 7,243,005 B1  
(45) Date of Patent: ***Jul. 10, 2007

(54) MODULAR IRRIGATION CONTROLLER

(75) Inventors: Matthew G. Beutler, Temecula, CA (US); Ronald H. Anuskiewicz, San Diego, CA (US); James F. McKnight, San Diego, CA (US); Santo Uccello, San Marcos, CA (US)

(73) Assignee: Hunter Industries, Inc., San Marcos, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/251,690

(22) Filed: Oct. 17, 2005

Related U.S. Application Data

(63) Continuation-in-part of application No. 10/973,573, filed on Oct. 26, 2004, now abandoned, which is a continuation of application No. 10/430,929, filed on May 5, 2003, now Pat. No. 6,842,667.

(51) Int. Cl.  
    *G06F 19/00*  (2006.01)
(52) U.S. Cl. .................. 700/284; 239/69; 137/624.11; 174/53; 174/50
(58) Field of Classification Search ............... 700/284; 239/69; 137/624.11; 361/331; 174/50, 174/53

See application file for complete search history.

(56) References Cited

U.S. PATENT DOCUMENTS

| 5,262,936 | A | | 11/1993 | Faris et al. ............... 364/140 |
| 5,921,280 | A | | 7/1999 | Ericksen et al. ....... 137/624.11 |
| 5,956,248 | A | * | 9/1999 | Williams et al. ............ 700/16 |
| 6,183,444 | B1 | * | 2/2001 | Glines et al. ............... 604/187 |
| 6,459,959 | B1 | | 10/2002 | Williams et al. ............ 700/284 |
| 6,705,882 | B2 | * | 3/2004 | Casses ....................... 439/157 |
| 6,767,153 | B1 | * | 7/2004 | Holbrook ..................... 403/56 |
| 2002/0033607 | A1 | * | 3/2002 | Worrall ....................... 292/202 |

OTHER PUBLICATIONS

Exhibit A, photocopy of digital photograph of ICC™ controller station module with spring members.
Exhibit B, photocopy of digital photograph of PRO-C™ station module mounting.
MOTOROLA IRRInet Product Specification Sheets (3pgs), dated Feb. 16, 1993.
MOTOROLA IRRInet Irrigation Controller Photocopies of Color Photographs (5) dated May 2004.

* cited by examiner

*Primary Examiner*—Michael D. Masinick
(74) *Attorney, Agent, or Firm*—Michael H. Jester

(57) ABSTRACT

A modular expandable irrigation controller has rotary, slide, lever, bayonet, screw, cam, hard, over-center, fork or push-pull locks for positively securing station modules in receptacles, individually or simultaneously.

6 Claims, 17 Drawing Sheets

MODULAR IRRIGATION CONTROLLER

CROSS-REFERENCE TO RELATED PATENT AND APPLICATION

This application is a continuation-in-part of U.S. patent application Ser. No. 10/973,573 of Matthew G. Beutler et al. filed Oct. 26, 2004 now abandoned which is a continuation of U.S. patent application Ser. No. 10/430,929 filed May 5, 2003 and now U.S. Pat. No. 6,842,667 granted Jan. 11, 2005.

FIELD OF THE INVENTION

The present invention relates to electronic irrigation controllers that control valves which supply water to sprinklers, and more particularly, to modular expandable irrigation controllers.

BACKGROUND OF THE INVENTION

Residential and commercial irrigation systems typically include one or more solenoid operated valves that are turned ON and OFF by an electronic irrigation controller. The valves admit water to various subterranean branch lines usually made of PVC pipe that typically have several sprinklers connected to risers coupled to the branch lines at spaced intervals. Each combination of a solenoid valve and its associated sprinklers is referred to in the irrigation industry as a station or zone. A modern electronic irrigation controller typically includes a microprocessor and separate memory, or a micro-computer with on-chip memory, that stores and executes one or more watering programs. The watering programs can be pre-programmed by the user via push button and/or rotary controls. The controller usually has an LCD or other display to facilitate programming by the user. The microprocessor controls the solenoid valves via suitable drivers and switching devices. The valves are opened and closed by the microprocessor in accordance with the pre-programmed run and cycle times for each of the stations.

Over the past decade, modular irrigation controllers have gained increasing popularity. In these controllers, the base portion of the system contains the microprocessor and user actuated controls. Each station is then controlled by a corresponding station module which comprises a plastic housing that encloses and supports a station module circuit, as well as wire connection terminals for connecting wires to a plurality of solenoid actuated valves. Typically each station module can independently control more than one solenoid actuated valve, i.e., station. The station modules contain pins, sockets, card edge connectors or some other standard form of electro-mechanical connectors for establishing electrical connections when the station modules are inserted into slots or receptacles in either the housing that contains the microprocessor or a separate back panel hinged to the microprocessor housing.

The advantage of a modular irrigation controller is that initially it need only be equipped with the minimum number of station modules that can control the total number of stations designed into the irrigation system from the outset. Thus, for example, an irrigation system may have only three zones, requiring only a single station module, while another may have twelve stations which might require four station modules. Considerable cost savings are thus achieved and less inventory of different sizes of irrigation controllers needs to be maintained by distributors. Moreover, if an irrigation system expands after initial installation because the landscaping has increased, additional station modules can readily be added. Also, station modules can be removed and replaced if damaged, for example, during a lightening strike.

When the station modules are plugged into the receptacles of a modular expandable irrigation controller they are mechanically supported and an electrical connection is made between the microprocessor and the driver. It has been conventional to use plastic spring members or elements to hold the station modules in place in their respective receptacles or slots. However, such springs often require considerable force to be exerted by the user, both during installation and withdrawal of the station modules. The spring members can also break and difficulties have been encountered in ensuring that a complete and positive electrical connection is both achieved and maintained. In some cases, station module installation can lead to breakage in the metal pins or metal leaf spring contacts used to make the electrical connection.

SUMMARY OF THE INVENTION

The present invention provides a modular expandable irrigation controller with improved station module locking mechanisms that minimize or eliminate the foregoing problems. The locking mechanisms include rotary, slide, lever, bayonet, screw, cam, hard, over-center, fork or push-pull locks for positively securing station modules in receptacles, individually or simultaneously.

DETAILED DESCRIPTION

The entire disclosures of co-pending U.S. patent application Ser. No. 10/973,573 of Matthew G. Beutler et al. filed Oct. 26, 2004 (published on Mar. 10, 2005 under No. US 2005/0055106 A1) and U.S. Pat. No. 6,842,667 granted Jan. 11, 2005 are hereby incorporated by reference.

Figure 1:
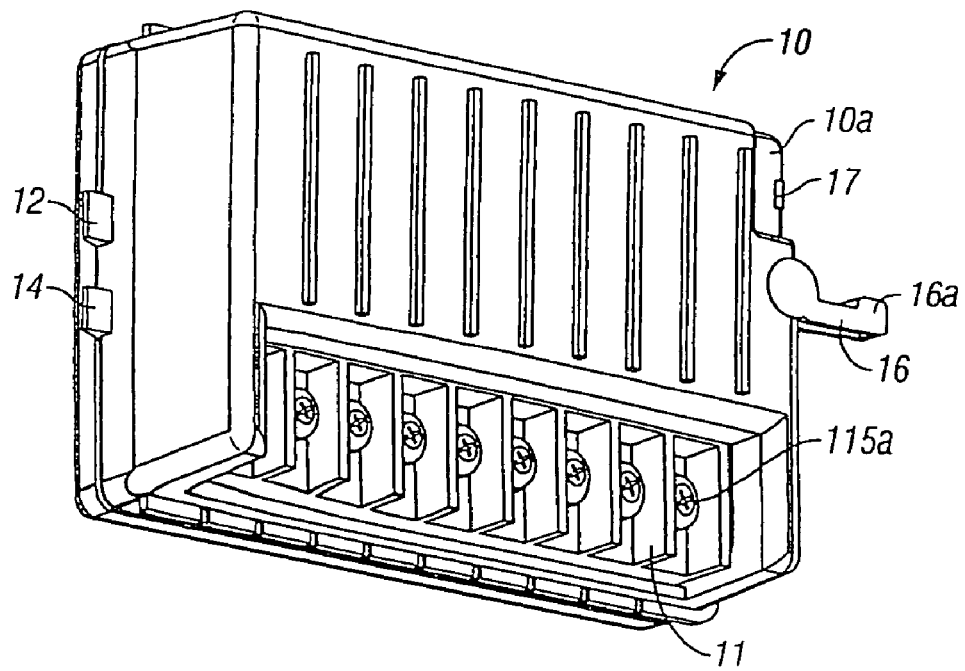
FIG. 1 is an enlarged perspective view of a station module of an embodiment of our invention in which the station modules have rotating levers for locking them in an irrigation controller.
Figure 2:
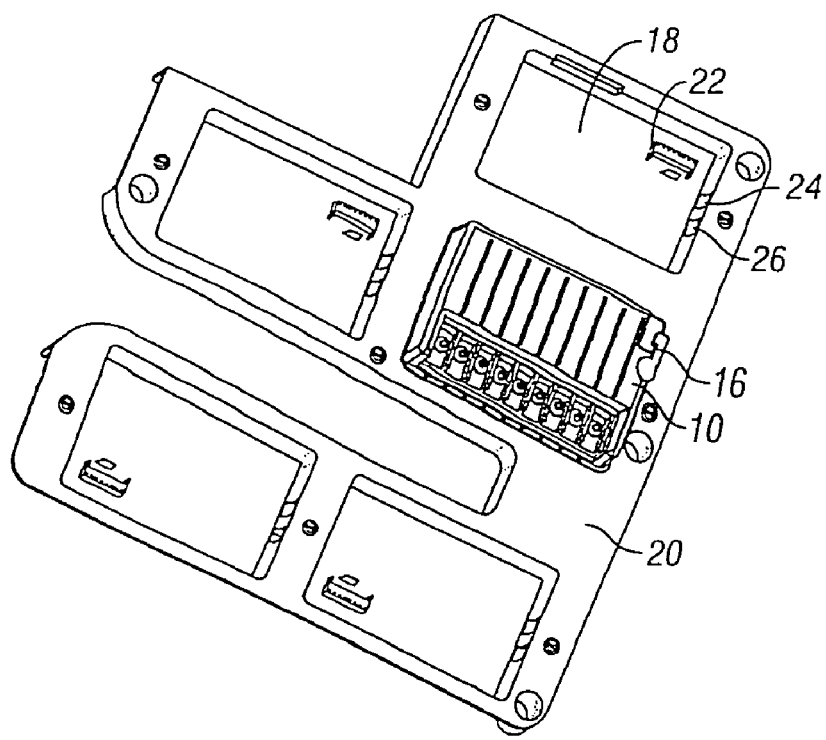
FIG. 2 is a fragmentary perspective view of the station module of FIG. 1 inserted into a back panel of the irrigation controller.
Figure 3:
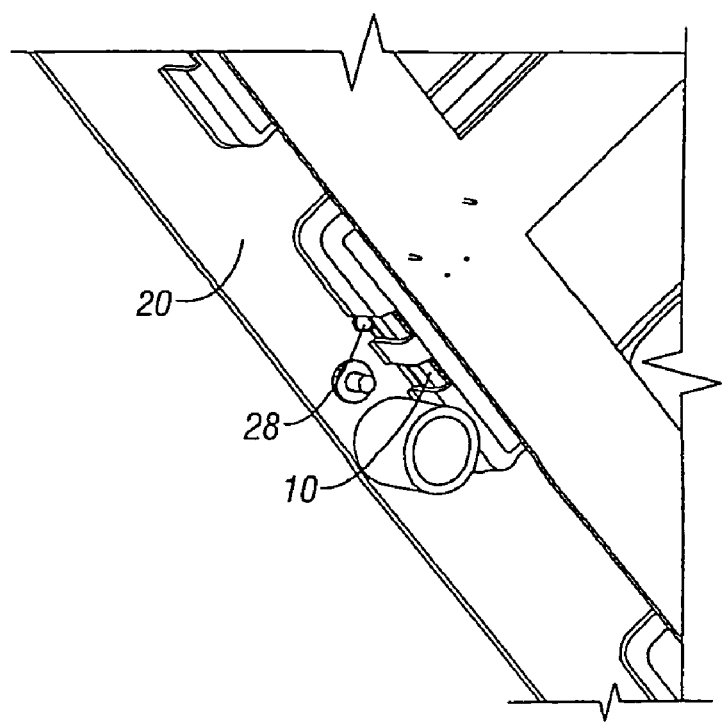
FIG. 3 is an enlarged fragmentary perspective of the rear side of the back panel illustrating the engagement of a locking tab with the back panel.

Referring to FIGS. 1-3, in accordance with an embodiment of our invention, a rectangular station module 10 has a pair of rigid (non-resilient) wedge-shaped tabs 12 and 14 that project from one end and a pivotable locking lever 16 that is mounted at the opposite end. The station module 10 is inserted into a receptacle such as 18 (FIG. 2) formed in the back panel 20 that is hinged to a separate housing (not shown) that contains the microprocessor. During the insertion of the station module 10 into the receptacle 18, the left end of the station module is first lowered into the receptacle 18 so that the wedge-shaped tabs 12 and 14 are inserted into corresponding side-by-side rectangular apertures in one end wall of the receptacle 18, which are similar to the two apertures 24 and 26 in the opposite end wall. The right end of the station module 10 is then lowered into the receptacle 18. At this time pins (not shown) on the back side of the station module 10 are plugged into corresponding holes in a female electrical connector 22 to establish connection with a serial bus.

Once the station module 10 has been fully inserted into the receptacle 18, the locking lever 16 is swung or pivoted ninety degrees from its extended (unlocked) position illustrated in FIG. 1 to its retracted (locked) position illustrated in FIG. 2. This motion is translated via a drive shaft (not illustrated) journaled in a bearing sleeve in the end wall of the station module 10 to move a planar locking tab 28 (FIG. 3) underneath the back panel 20. The various parts are dimensioned to provide a snug or tight fit when the locking lever 16 is moved to its locked position. Thus, the station module 10 is locked and held in place within the receptacle 18 via the wedge-shaped tabs 12 and 14 and the planar locking tab 28. The station module 10 can be removed from the receptacle 18 by swinging the locking lever 16 to its unlocked position and first lifting the right end of the station module to unplug its pins from the connector 22 and then lifting the left end of the station module to remove the wedge-shaped tabs 12 and 14 from their corresponding apertures in the left end wall of the receptacle 18. An important aspect of the controller illustrated in FIGS. 1-3 is that the station module 10 will fit in the receptacles of an older design. In other words, the station module 10 is backward compatible with an original commercial design of the controller.

Figure 6:
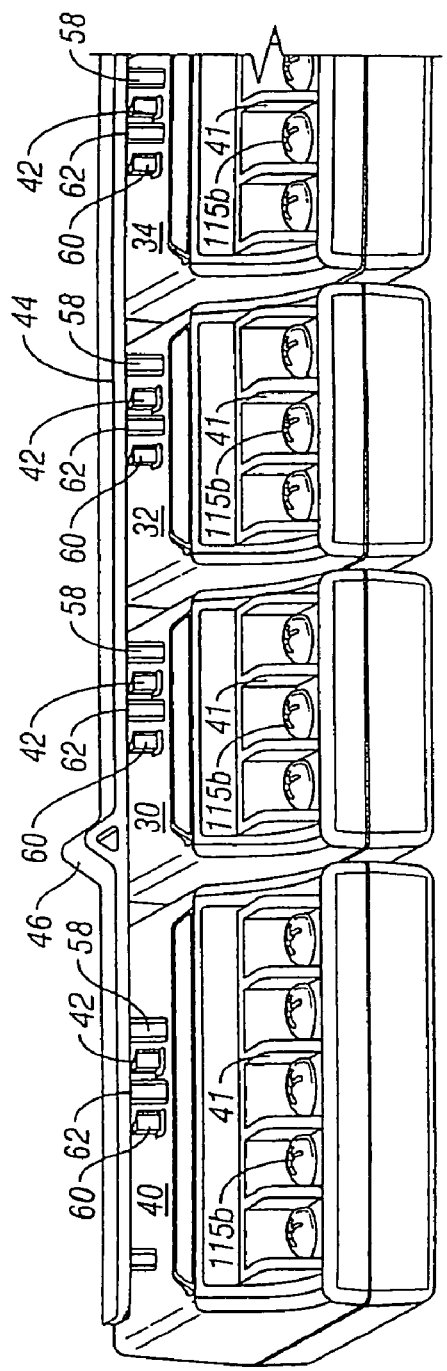
FIG. 6 is an enlarged fragmentary perspective view illustrating the relationship of the slide bar to four modules installed side-by-side in its bay when the slide bar is in its UNLOCKED position.
Figure 7:
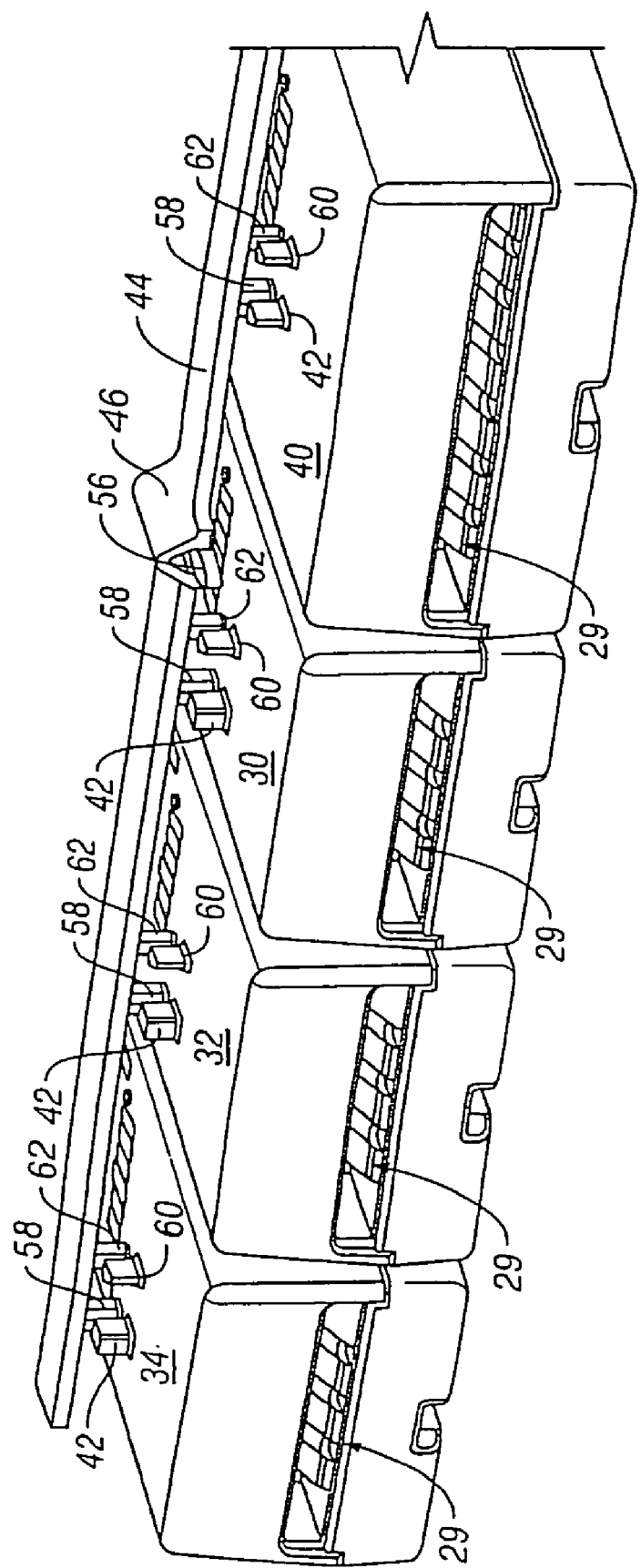
FIG. 7 is an enlarged fragmentary perspective view similar to FIG. 6 but taken from a different angle and illustrating the relationship of the slide bar to four modules installed side-by-side in its bay when the locking slide bar is in its LOCKED position.
Figure 8:
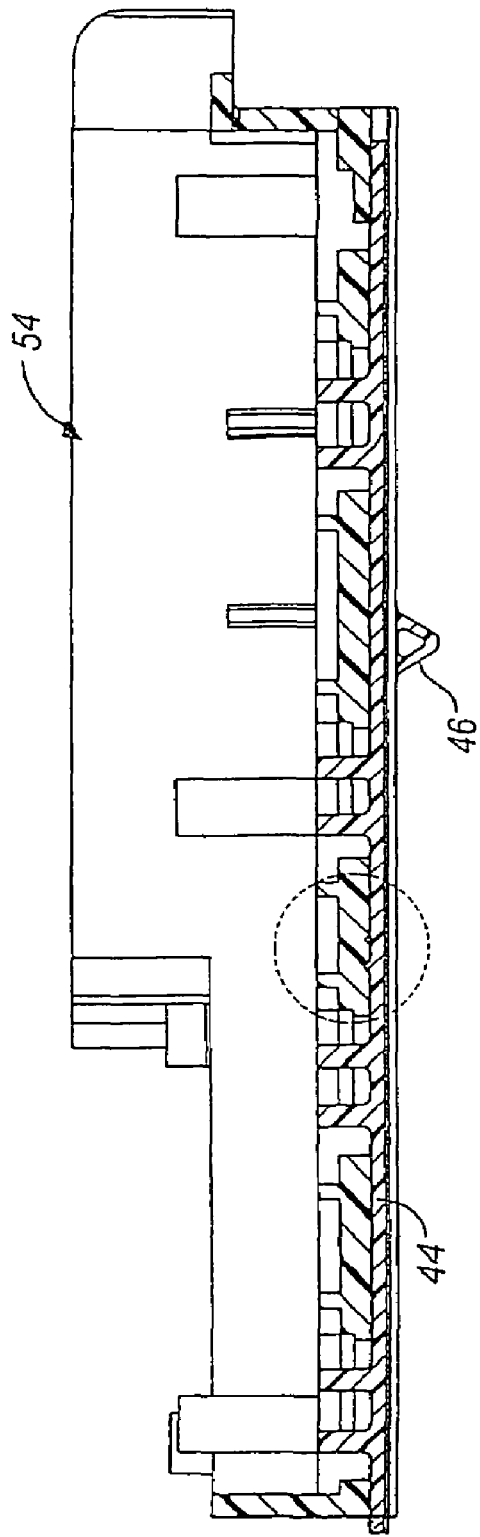
FIG. 8 is an enlarged vertical sectional view of the locking slide bar taken along line 8-8 of FIG. 5.
Figure 9:
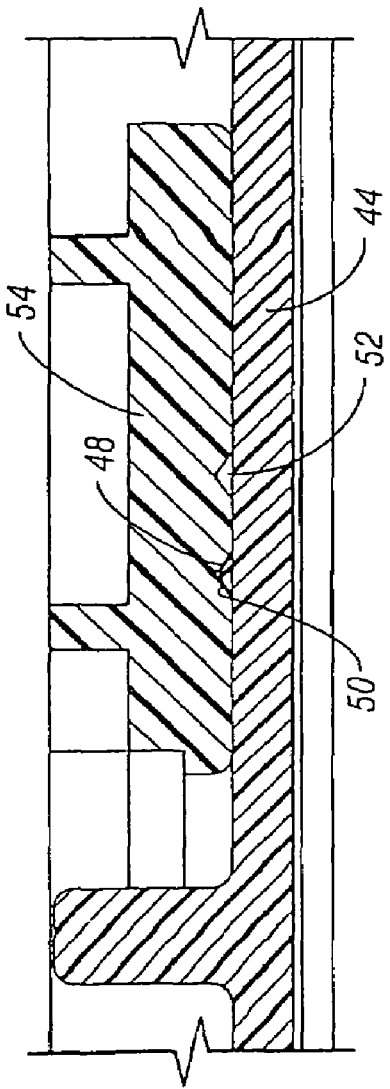
FIG. 9 is a greatly enlarged fragmentary view of the portion of the slide bar circled in FIG. 8.

Another embodiment of our invention is illustrated in FIGS. 4-9. Referring to FIG. 7, female electrical connectors 29 in the ends of three box-like station modules 30, 32 and 34 receive corresponding card edge connectors such as 36 (FIG. 5) with mating electrical contacts. The station modules 30, 32 and 34 are received in side-by-side fashion in a bay formed in a rectangular back panel 38 (FIG. 4) that is separate from the housing (not illustrated) that encloses the microprocessor. A larger, fourth box-like power module 40 (FIG. 6) plugs into the bay onto its own card edge connector and drives the pump master valve and the first three station modules 30, 32 and 34. The upper sides of the modules 30, 32, 34 and 40 each have an upstanding projection 42 (FIG. 6). A locking slide bar 44 (FIG. 8) with a V-shaped gripping member 46 extends above the bay and may be slid laterally (left and right) between an unlocked position illustrated in FIG. 6 and a locked position illustrated in FIG. 7. A V-shaped bump 48 (FIG. 9) on the underside of the locking slide bar 44 can alternately register with different V-shaped detents 50 and 52 formed in a cover 54 to hold the locking slide bar 44 in its locked and unlocked positions. A pointed tab 56 (FIG. 4) extending from the gripping member 46 alternately points to UNLOCKED and LOCKED indicia molded into the adjacent back panel structure to indicate the module connection status to the user.

Figure 4:
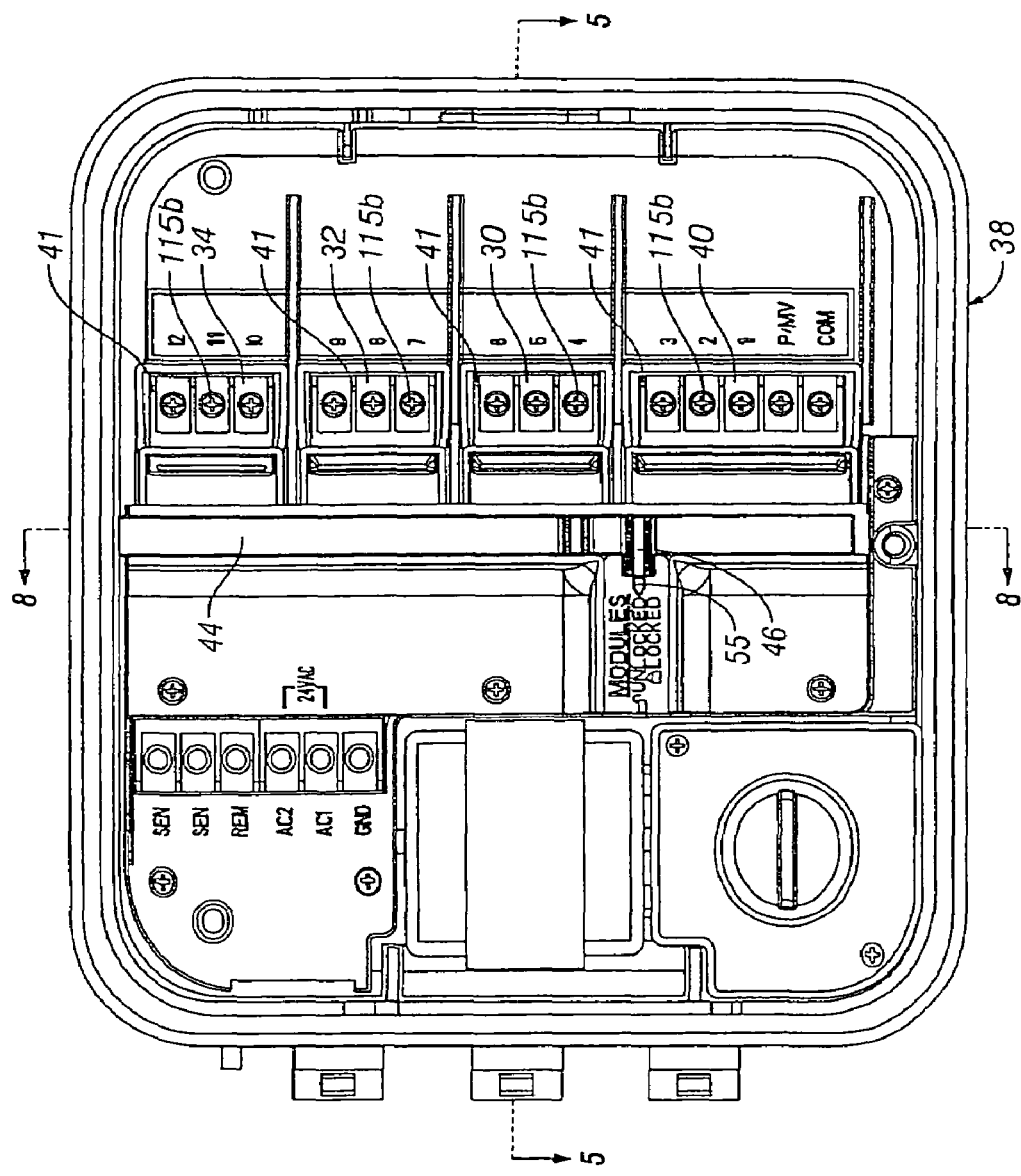
FIG. 4 is a top plan view of another embodiment of the present invention in which a slide bar is moved back and forth to simultaneously lock and unlock a plurality of station modules in an irrigation controller.
Figure 5:
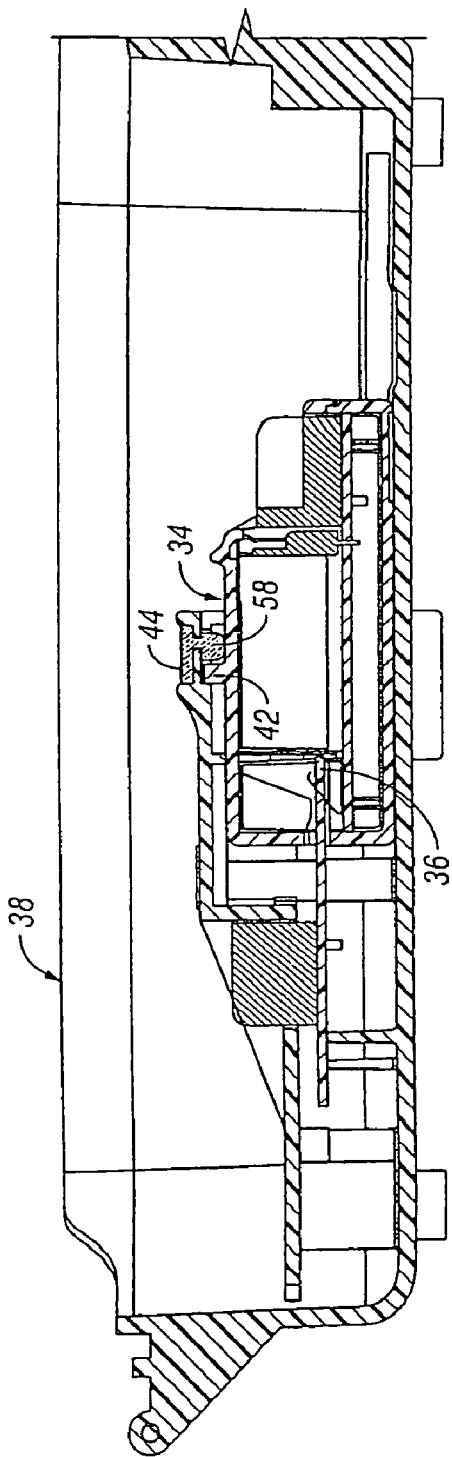
FIG. 5 is a vertical sectional view taken along line 5-5 of FIG. 4.

When the locking slide bar 44 is moved to the right in FIG. 4 to its locked position, downwardly extending locking elements 58 (FIG. 5) move behind the upstanding projection 42 on each of the modules 30, 32, 34 and 40 to mechanically lock the modules in the bay and prevent their withdrawal. Any or all of the modules can be removed from the bay by moving the locking slide bar 44 to the left in FIG. 4 to its unlocked position so that the locking elements 58 are cleared from behind the projections 42 to permit the modules to be pulled off of their corresponding card edge connectors. The new modules 30, 32, 34 and 40 of the controller of FIGS. 4-9 are backward compatible with an earlier original design of the controller because they simply plug into the card edge connectors which hold them in place. The old modules of the original controller are also forward compatible with the re-designed controller. FIGS. 6 and 7 also illustrate the upstanding projection 60 of the old modules which is spaced laterally with respect to the upstanding projection 42 of the newer modules. The locking slide bar 44 has alternate downwardly extending locking elements 62 (that are laterally displaced from the locking elements 58) and move behind the upstanding projections 60 of the older modules to lock them in place. The old modules only have the upstanding projection 60 and the new modules only have the upstanding projection 42, but both are shown in FIGS. 6 and 7 at the same time in order to illustrate the backward and forward compatibility.

Referring to FIG. 6, the upstanding projections 42 and 60 have a triangular cross-section. the downwardly extending locking elements 58 and 62 have a rectangular cross-section. The projections 42 and 60 are oriented so that if a user tries to insert a module, such as 32 into a vacant receptacle in the bay formed in the rectangular back panel 38 when the slide bar 44 is in its locked position, the slide bar 44 will be forced to its unlocked position. This takes place as a result of the angled surfaces on the projections 42 and 60 colliding with and sliding the locking elements 58 and 62 laterally. This automatic unlocking feature prevents breakage of the projections 42 and 60 and/or the locking elements 48 and 62.

Thus the embodiments of our invention described above each have a locking member that is manually movable in the sense that it has with an outer portion that is ergonomically configured to be grasped by a user's hand and pivoted or slid to positively lock one or more station modules in place. The locking lever 16 has an enlarged outer portion 16*a* (FIG. 1) that snaps over a small projection 17 in a cut-out corner 10*a* of the station module 10 to hold the lever in its locked position illustrated in FIG. 2. The V-shaped gripping member 46 (FIG. 7) is readily grasped between the user's thumb and index finger. The positive module locking mechanisms of FIGS. 1-9 guard against partial or incomplete insertion of a station module that could lead to shorts that would make the station or zone inoperable. The user is given visual and tactile feedback indicating that a positive lock has been established in the sense that each module has been fully inserted. In the case of the embodiment illustrated in FIGS. 1-3 each station module 10 is independently locked and unlocked. In the case of the embodiment illustrated in FIGS. 4-9, a plurality of modules 30, 32, 34 and 40 are simultaneously locked and unlocked with respect to their respective receptacles.

The back panel 20 (FIGS. 2 and 3) is typically mounted on a vertical wall of a building structure so that each station module 10 is plugged in an removed in a generally horizontal direction away from the user, and toward the user, respectively. The back panel 38 (FIG. 4) is also typically installed on a vertical wall of a building structure so that the modules, such as 30 (FIG. 6) are plugged in and removed in a horizontal direction, lateral relative to the user. In other words, the back panel 38 is oriented so that the modules are in a vertical column with the station module 34 on top and the power module 40 on the bottom. In both the embodiments illustrated in FIGS. 1-9 the weight of the modules cannot tend to unplug the same.

Figure 10:
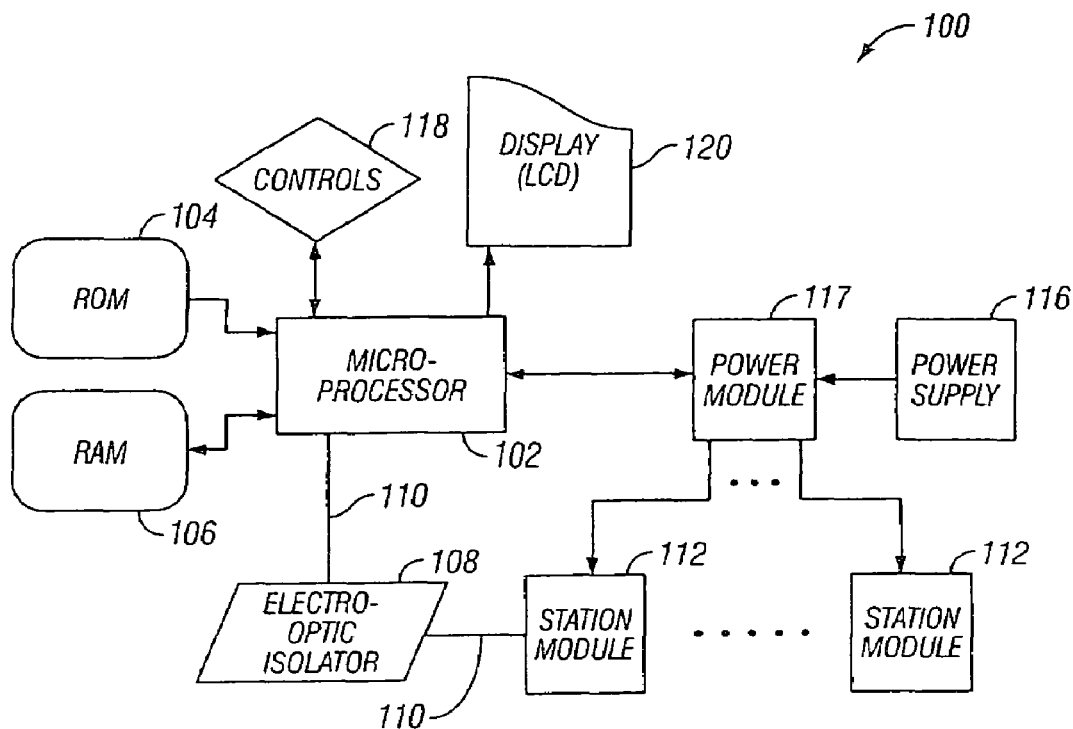
FIG. 10 is a block diagram of the overall irrigation controller circuit that may be used in the irrigation controllers illustrated in FIGS. 1-9.

FIG. 10 is a simplified block diagram of the electronic circuit 100 that may be used with any of the embodiments described herein. Briefly, a microprocessor 102 executes a selected watering program stored in ROM 104 using RAM 106. The microprocessor 102 is coupled through an optional electro-optic isolator 108 and a serial bus 110 to one or more removable station modules 112 each including a station module circuit 114 for energizing and de-energizing the solenoid of a valve (not illustrated) connected thereto via insulated wires (not illustrated). The electro-optic isolator 108 protects the microprocessor 102 from damage if lightening should destroy one or more of the station modules 112, but it may be eliminated for cost savings.

The stripped inner ends of the wires that lead to the solenoid valves are secured to conventional screw terminals 115*a* (FIG. 1) on each of the modules 10 (FIG. 1) or 115*b* (FIG. 6). The screw terminals 115*a* are separated by upstanding divider walls 11 (FIG. 1) to prevent contact between adjacent wires. Similarly, the screw terminals 115*b* are separated by upstanding divider walls 41 (FIG. 6) to prevent contact between adjacent wires.

The term "solenoid actuated valve" as used herein encompasses valves in which a pilot valve is directly or indirectly opened and closed by a solenoid. These include hydraulically or pneumatically actuated valves which have a solenoid or its electrical equivalent somewhere in the fluid system, and not necessarily next to the gating valve, for controlling the fluid pressure to open and close the valves.

A power supply 116 (FIG. 10) supplies the power needed to run the microprocessor 102 and energize the solenoids of the valves. A removable power module 117 contains current sensing resistors and has pump output terminals. Power is routed from the power supply 116 through the power module 117 to the microprocessor 102 and to the station modules 112. The DC power to run the microprocessor 102 and the logic circuitry inside the station modules 112 is supplied by the power supply 116 through the power module 117 to the microprocessor 102 and then back through the power module 117 to the station modules 112. The AC power for switching the solenoid actuated valves ON and OFF is supplied from the power supply 116 through the power module 117 to the station modules 112. A set of manually actuated controls 118 are connected to the microprocessor 102 for allowing a watering program to be entered, selected, altered, etc. with the aid of graphic and/or alphanumeric symbols shown on LCD 120. The controls may include a rotary switch, one or more pushbuttons, one or more slide switches, one or more membrane switches, one or more toggle switches, one or more insertable pins, a DIP switch, etc. Instead of using separate microprocessor 102, ROM 104 and RAM 106, a single micro-computer with on-chip memory may be utilized.

The preferred electronic configuration of our irrigation controller includes a main PC board (not illustrated) which supports the microprocessor 102, ROM 104, RAM 106, electro-optic isolator 108, serial bus 110 manual controls 118 and LCD 120. This main PC board is mounted inside a housing (not illustrated) which is connected via ribbon cable to a back panel such as 20 (FIG. 2) or 38 (FIG. 4) that is hinged to the housing. The back panel 20 or 38 provides the receptacles for removably receiving the station modules 10 or 30, 32, 34.

A port (not illustrated) may be connected to the microprocessor 102 for downloading a watering program that has been created on a personal computer and downloaded into a smart card, portable data shuttle or other removable media. See for example U.S. Pat. No. 6,088,621 granted Jul. 11, 2000 of Peter J. Woytowitz et al. entitled PORTABLE APPARATUS FOR RAPID RE-PROGRAMMING OF IRRIGATION CONTROLLERS, also assigned to Hunter Industries, Inc., the entire disclosure of which is hereby incorporated by reference. Alternatively, the microprocessor could receive programming and/or commands from a master computer via hard-wired or wireless connection.

Figure 11:
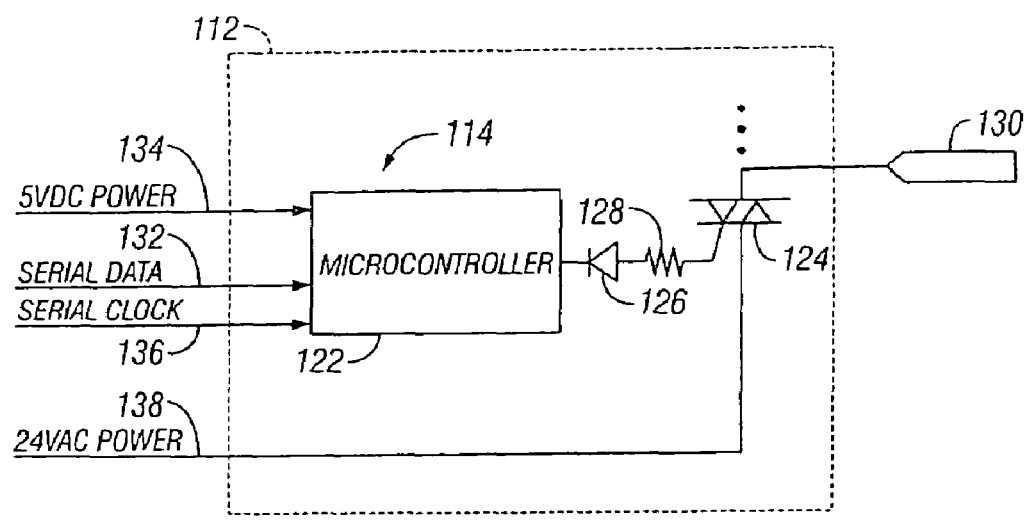
FIG. 11 is a schematic diagram of an exemplary circuit for one of the station modules of the irrigation controller circuit of FIG. 10.

The microprocessor 102 controls a plurality of solenoid actuated valves via the corresponding station module circuit 114 (FIG. 11) which is mounted on a small PC board contained within the plastic housing of each station module 112. The station module circuit 114 includes a microcontroller 122 that drives a switching device in the form of a triac 124 through a diode 126 and resistor 128. The triac 124 comprises two silicon controlled rectifiers (SCRs) connected in parallel and oppositely oriented to allow bi-directional control of a standard twenty-four volt AC signal sent to the solenoid of a valve via terminal 130. The control signal from the serial bus is applied to the microcontroller 122 via serial data lead 132 while a nominal DC voltage signal, such as five volts, is applied via another lead 134. Synchronous serial data is clocked into the microcontroller 122 from the microprocessor 102 via clock lead 136. Twenty-four volt AC power is supplied from the power module 116 to the triac 124 via lead 138. In the preferred embodiment of the station module circuit 114 triac 124, diode 126 and resistor 128 are duplicated eight times so that one station module 112 can independently control up to eight solenoid actuated valves (stations). The valves that supply water to the sprinklers can thus be independently opened and closed by the microprocessor 102 utilizing the station module circuits 114 in accordance with the selected and/or pre-programmed run and cycle times for each of the stations. See also U.S. Pat. No. 5,444,611 granted Aug. 22, 1995 of Peter J. Woytowitz et al. entitled LAWN AND GARDEN IRRIGATION CONTROLLER, also assigned to Hunter Industries, Inc., the entire disclosure of which is hereby incorporated by reference.

Figure 12:
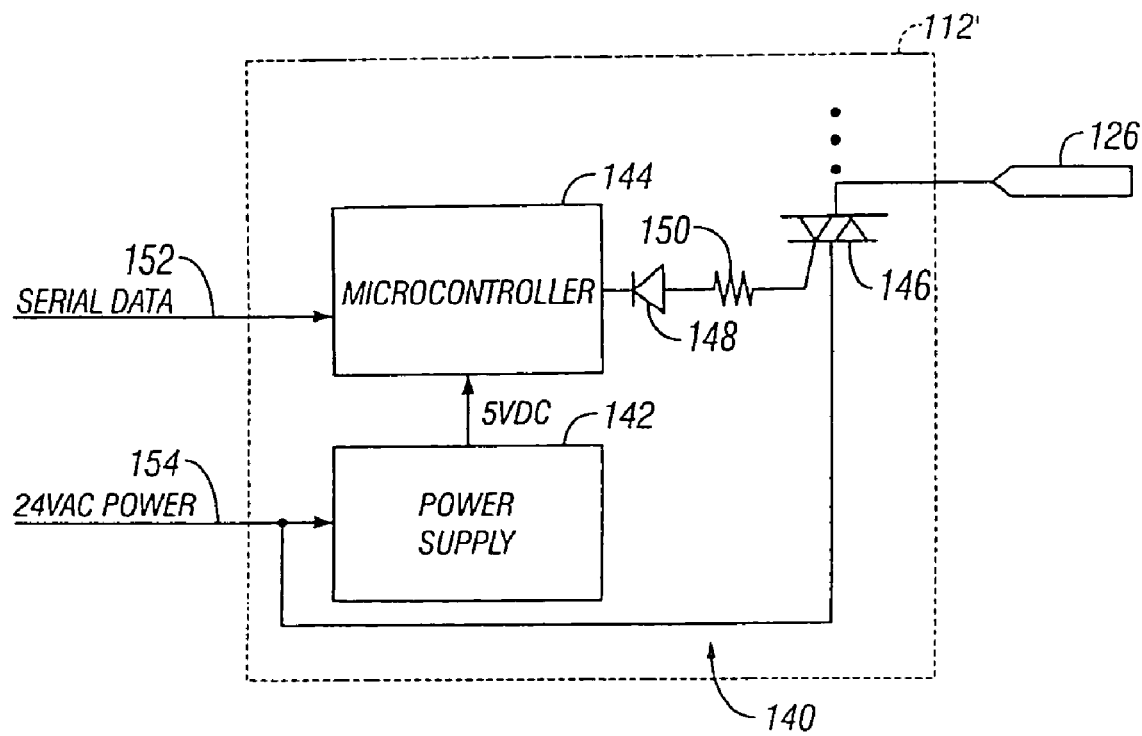
FIG. 12 is a schematic diagram of an alternate circuit for one of the station modules.

FIG. 12 is a schematic diagram of an alternate circuit 140 for one of the station modules 112'. Each station module 112' has its own power supply 142 that supplies a five volt DC signal to a microcontroller 144 that can switch a triac 146 through diode 148 and resistor 150. The station modules 112' each have three sets of the triac 146, diode 148 and resistor 150 (not illustrated) for independently actuating three stations. The alternate station module circuit 140 (FIG. 12) receives asynchronous serial data on serial data line 152. In other words, the microcontroller 144 of the station module 112' derives its clock signal from the serial data signal. Twenty-four volt AC power is supplied to each power supply 142 inside each station module 112' via lead 154.

Figure 13A:
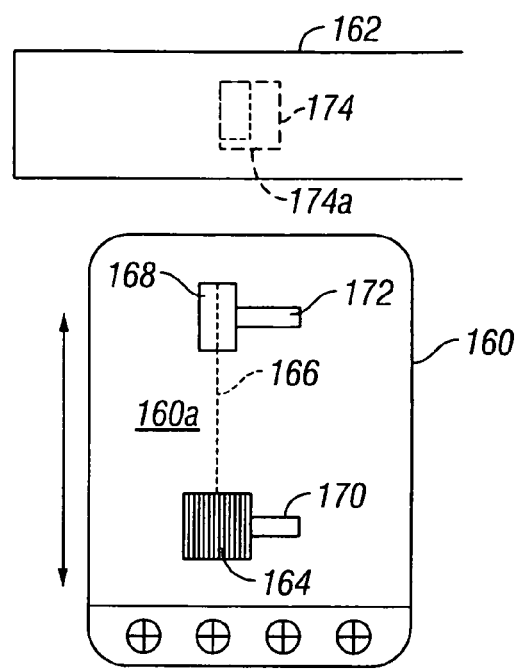
FIGS. 13A, 13B and 13C are diagrammatic views illustrating an alternate embodiment of a modular expandable irrigation controller in which the station modules have individual thumb actuated slide locks.
Figure 13B:
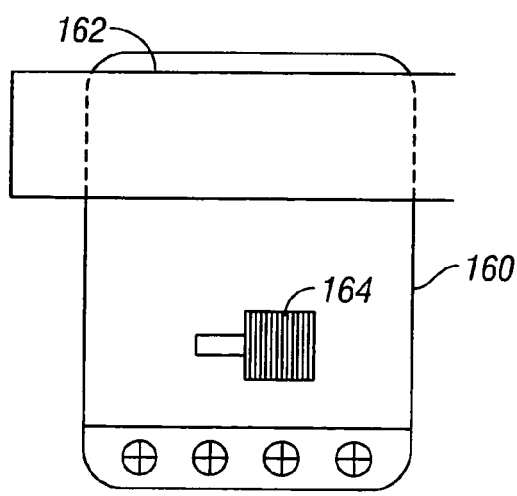
Figure 13C:
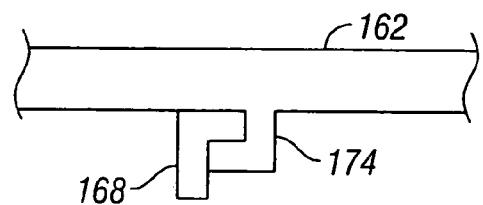

Referring to FIG. 13A, in another embodiment of a modular expandable irrigation controller, each station module 160 has a separate slide lock mechanism for individually securing the station module 160 in a corresponding receptacle in a controller housing that extends under a cross-piece 162. The slide lock mechanism includes a serrated thumb slide 164 connected via strut 166 to an inverted L-shaped lock member 168 (FIG. 13C). The thumb slide 164 and lock member 168 are connected to the strut 166 (FIG. 13A) via vertical projections (not illustrated) that extend through elongated apertures 170 and 172 in the top side 160a of the station module 160. A complementary L-shaped lock member 174 (FIG. 13C) extends downward from the cross-piece 162. After the station module 160 is slide into the receptacle under the cross-piece 162 the user moves the thumb slide 164 to the right as illustrated in FIG. 13B with his or her thumb. This causes the inverted L-shaped lock member 168 to slide to the right into engagement with the L-shaped lock member 174 as illustrated in FIG. 13C. A laterally extending flange 174a (FIG. 13A) on the lock member 174 prevents the station module 160 from being withdrawn from the receptacle until the thumb slide 164 is slid to the left. The embodiment illustrated in FIGS. 13A, 13B and 13C could be reversed, i.e., the individual slide lock mechanisms could be mounted on the cross-piece 162 instead of being mounted on the station modules 160.

Figure 14:
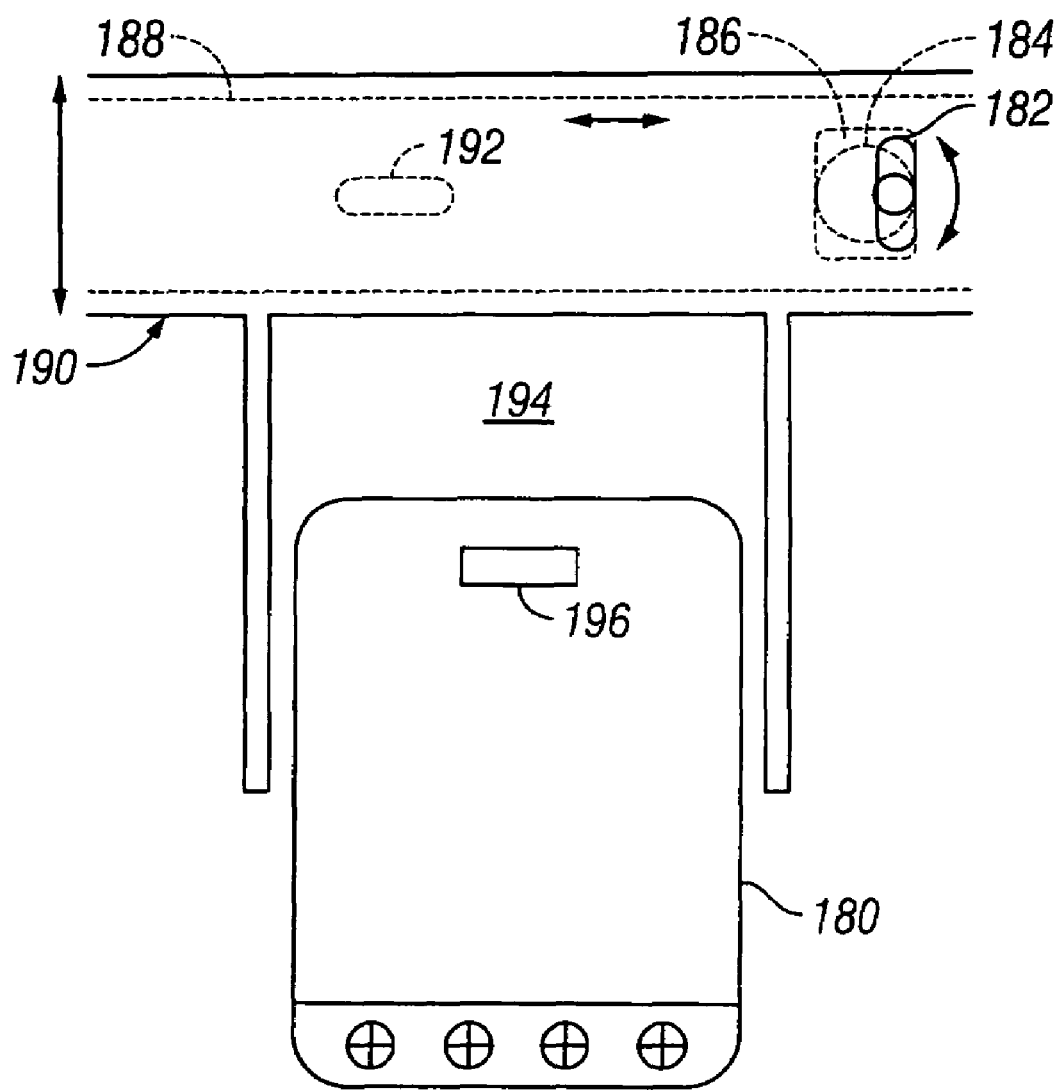
FIG. 14 is a diagrammatic view illustrating an alternate embodiment of a modular expandable irrigation controller in which the station modules are simultaneously locked into the controller with a cam actuated slide bar.

Referring to FIG. 14, in another embodiment of our modular expandable irrigation controller, a plurality of station modules such as 180 are simultaneously locked and unlocked by manually turning a grip member 182. The grip member 182 is connected to an eccentric cam 184 that engages the walls of a square aperture 186 in a slide bar 188 that slides beneath a cross-piece 190 of the controller housing. Projections such as 192 that extend downwardly from the slide bar 188 into the receptacles 194 move in behind projections such as 196 on the upper sides of the station module 180 to prevent them from being withdrawn.

Figure 15:
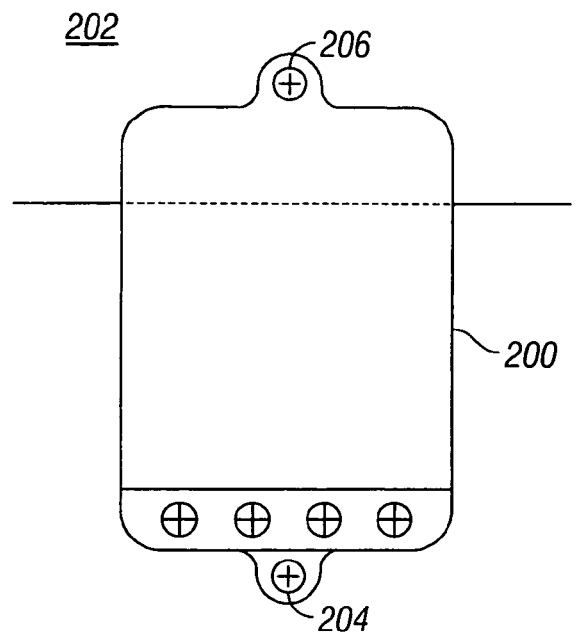
FIG. 15 is a diagrammatic view illustrating an alternate embodiment of a modular expandable irrigation controller in which the station modules are individually locked into the controller with mounting screws.

Referring to FIG. 15, in another embodiment of our modular expandable irrigation controller, a plurality of station modules such as 200 each slide into corresponding receptacles in the controller housing over a cross-piece 202. The modules 200 are secured in place to the housing via screws 204 and 206 that extend through holes in tabs on opposite ends of the modules 200 and into threaded holes in the controller housing.

Figure 16:
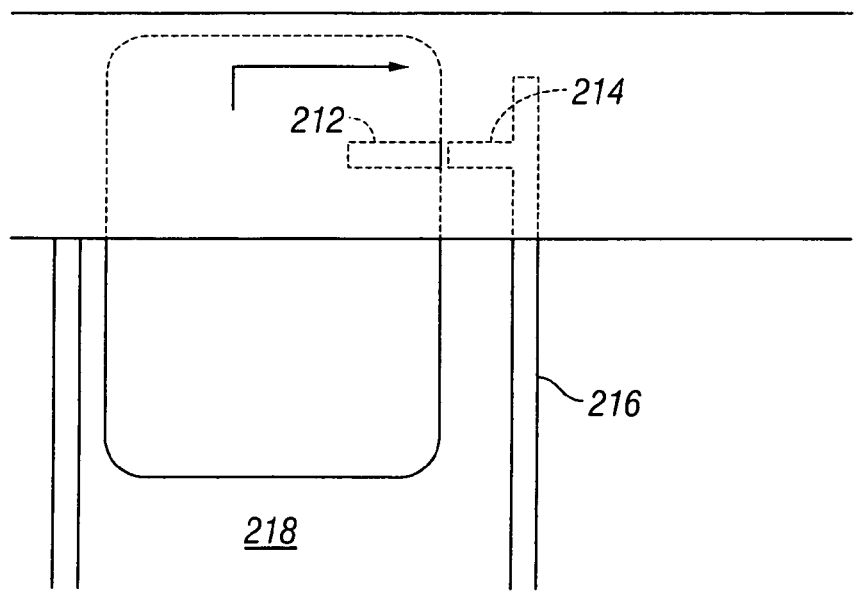
FIG. 16 is a diagrammatic view illustrating an alternate embodiment of a modular expandable irrigation controller in which the station modules are individually slid into receptacles and then moved to the right to lock them in place.

Referring to FIG. 16, in another embodiment of our modular expandable irrigation controller the station modules such as 210 are individually slid vertically into receptacles and then moved to the right to lock them in place. A lateral projection 212 on the top of each module 210 slides behind a lateral projection 214 that extends from one of the side walls 216 defining a receptacle 218. This hard lock arrangement does not rely upon substantial flexing of any plastic member, but instead relies upon close dimensional tolerances of injection molded structures for a tight fit.

Figure 17:
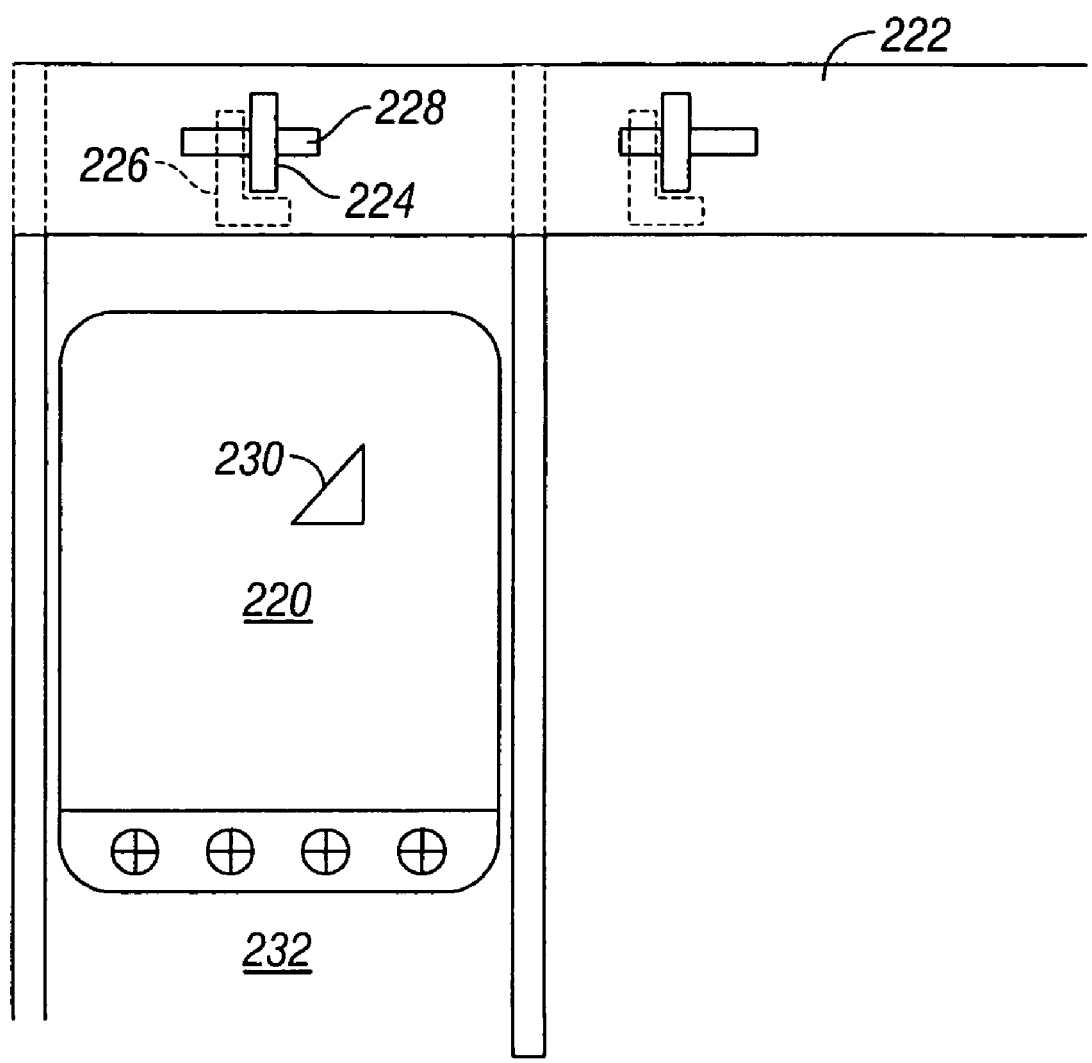
FIG. 17 is a diagrammatic view illustrating an alternate embodiment of a modular expandable irrigation controller in which the station modules are individually locked in their respective receptacles by individual slide locks on the controller housing.

Referring to FIG. 17, in another embodiment of our modular expandable irrigation controller the station modules such as 220 are individually locked in their respective receptacles by individual slide locks mounted on the cross-piece 222 of the controller housing. These slide locks each have a thumb slide 224 that is connected to an L-shaped member 226 via slot 228 in the cross-piece 222. The L-shaped member 226 slides behind a triangular projection 230 on the upper side of each module 220 to prevent its withdrawal from receptacle 232. Thus with the thumb slide 224 to the left the module 220 can be fully inserted or withdrawn from the receptacle 232. With the module 220 fully inserted, the thumb slide 224 can be moved to the right to lock the module 220 in the receptacle 232.

Figure 18:
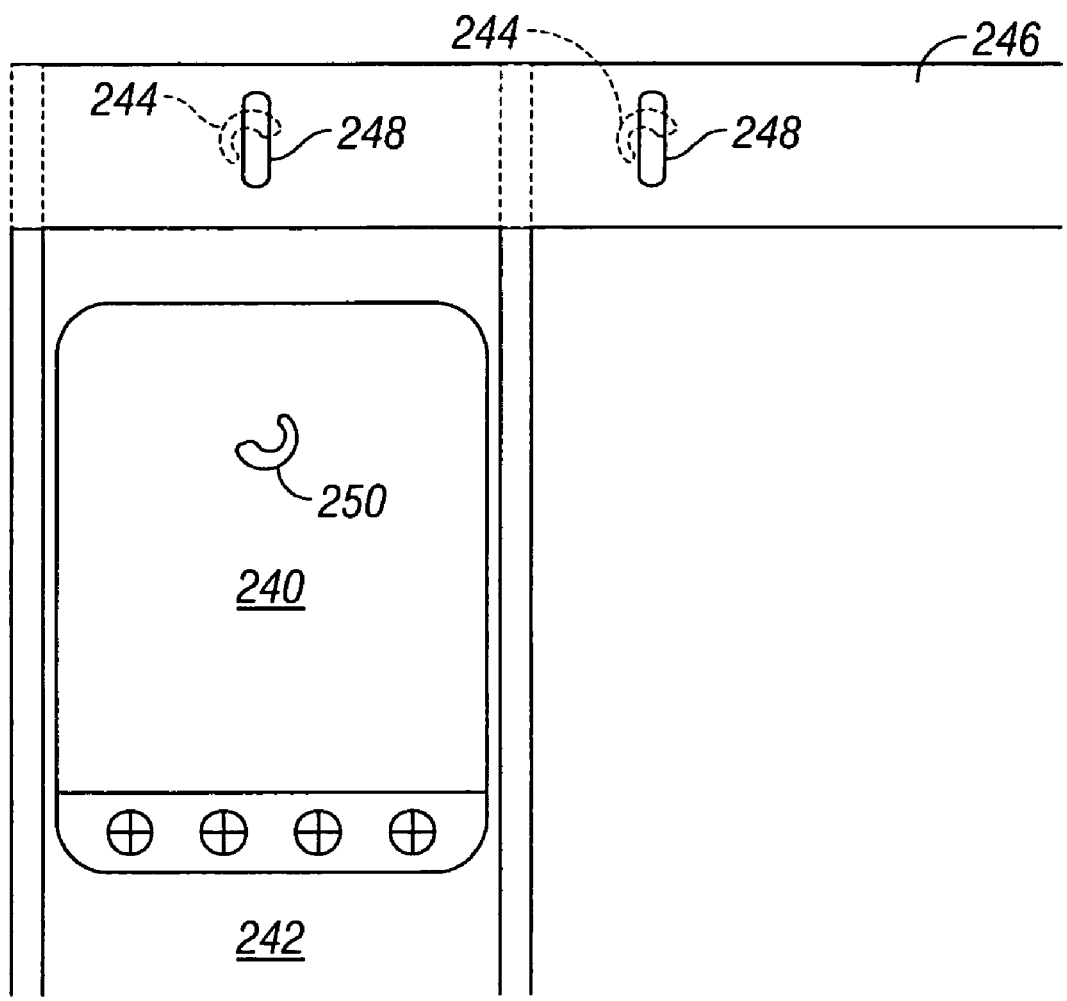
FIG. 18 is a diagrammatic view illustrating an alternate embodiment of a modular expandable irrigation controller in which the station modules are individually locked in their respective receptacles by individual rotary crescent-shaped locks on the controller housing.

Referring to FIG. 18, in another embodiment of our modular expandable irrigation controller the station modules such as 240 are individually locked in their respective receptacles 242 by individual rotary crescent-shaped cam members 244. The crescent-shaped cam members 244 are mounted to the lower ends of posts (not illustrated) that extend through bearing holes (not illustrated) in a cross-piece 246 of the controller housing. Cross-member actuators 248 are mounted to the upper ends of these posts and can be rotated manually to engage complementary crescent-shaped cam members such as 250 molded to the upper side of each module 240 after the module 250 has been fully inserted.

Figure 19:
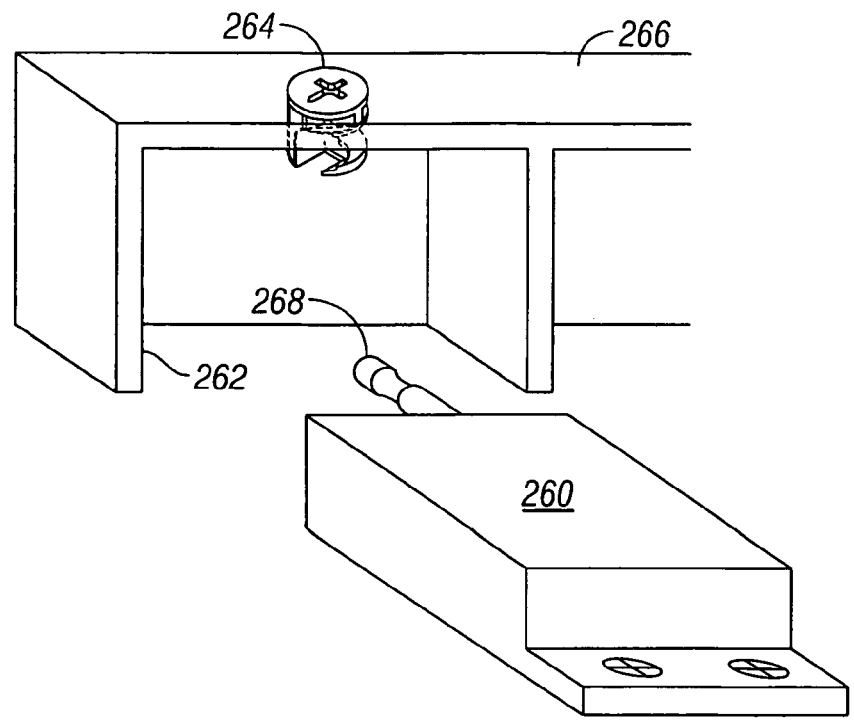
FIG. 19 is a diagrammatic view illustrating an alternate embodiment of a modular expandable irrigation controller in which the station modules are individually locked in their respective receptacles by individual rotary cam locks on the controller housing.

Referring to FIG. 19, in another embodiment of our modular expandable irrigation controller the station modules such as 260 are individually locked in their respective receptacles 262 by individual rotary cam locks such as 264 that are mounted in apertures in a cross-piece 266 of the controller housing. The cam locks 264 engage the complementary shaped distal ends of pins such as 268. The proximal end of the pin 268 is secured in the forward end wall of the module 260. Once the module 260 is fully inserted into the receptacle 262 the rotary cam lock 264 is turned counter-clockwise with a Phillips screwdriver to lock the module 260 in place. The rotary cam locks 264 and pins 268 are of the type commonly used to hold together furniture and cabinets which are assembled by the purchaser. See www-.millspride.com/assemblysheets/documents/9060353G.pdf.

Figure 20:
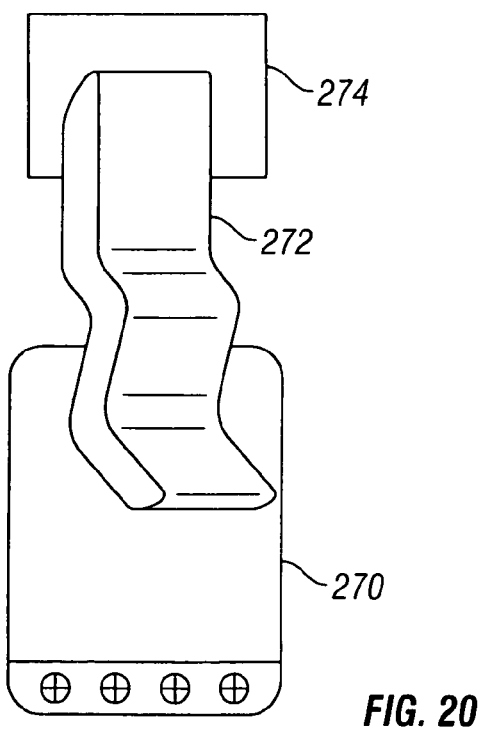
FIG. 20 is a diagrammatic view illustrating an alternate embodiment of a modular expandable irrigation controller in which the station modules are individually locked in their respective receptacles by individual over-center latch locks.

Referring to FIG. 20, in another embodiment of our modular expandable irrigation controller the station modules such as 270 are individually locked in their respective receptacles by individual over-center latch lock mechanisms 272 that have respective parts mounted to the module 270 and cross-piece 274. The over-center latch lock mechanisms 272 are similar to those commonly used in ski boots and in line skate boots.

Figure 21:
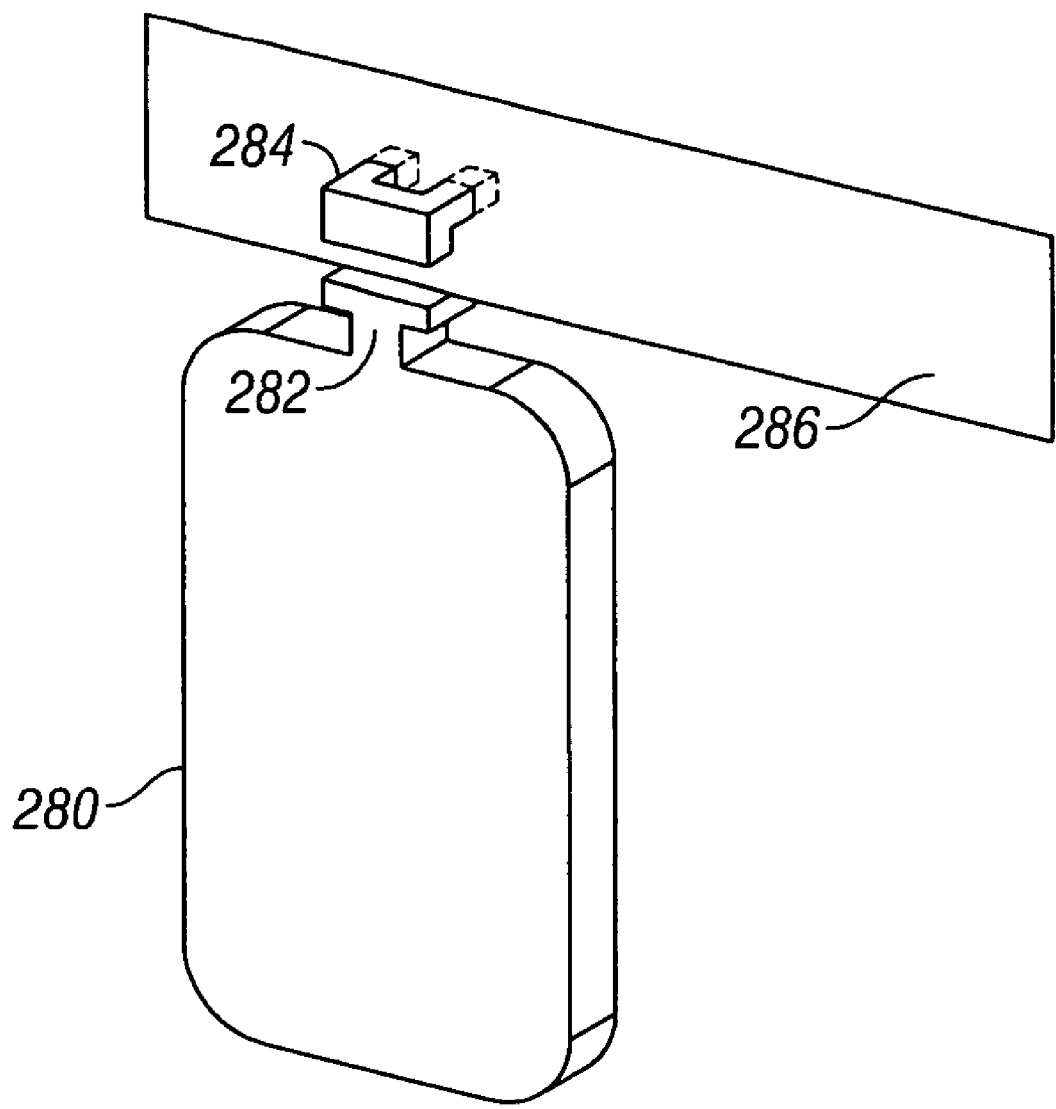
FIG. 21 is a diagrammatic view illustrating an alternate embodiment of a modular expandable irrigation controller in which the station modules are individually locked in their respective receptacles with forks.

Referring to FIG. 21, in another embodiment of our modular expandable irrigation controller the station modules such as 280 have T-shaped pins such as 282 that project from the forward ends thereof. The modules 280 are individually locked in their respective receptacles with forks such as 284. Each pin 282 is undercut and can be slid under a cross-piece 286 of the controller housing. Once the module 280 is fully inserted in it receptacle, the fork 284 can be pushed downwardly, causing it to slide through a complementary shaped aperture in the cross-piece 286. The legs of the fork 284 then slide on either side of the central body of the T-shaped pin 282 to lock the module 280 in place. The locations of the pin 282 and fork 284 can be reversed.

Figure 22:
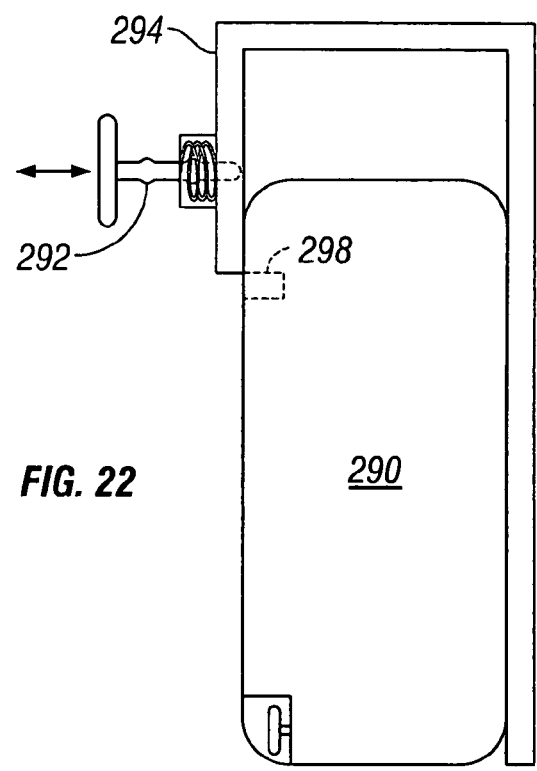
FIG. 22 is a diagrammatic view illustrating an alternate embodiment of a modular expandable irrigation controller in which the station modules are individually locked in their respective receptacles with push-pull locks on the housing.

Referring to FIG. 22, in another embodiment of our modular expandable irrigation controller the station modules such as 290 are individually locked in their respective receptacles with push-pull spring biased blade locks such as 292 mounted on a cross-piece 294 of the controller housing. Each blade lock 292 moves vertically, i.e. substantially perpendicular to the plane of the base of the receptacles. The distal end of each blade lock 292 is received in a hole 298 in the upper side of the module 290.

Figure 23:
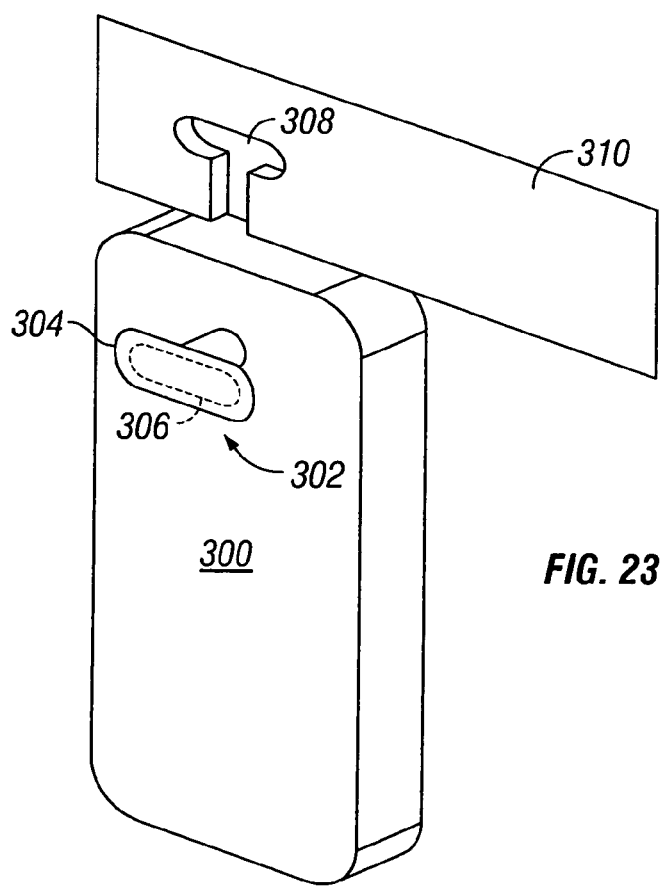
FIG. 23 is a diagrammatic view illustrating an alternate embodiment of a modular expandable irrigation controller in which the station modules are individually locked in their respective receptacles with push-pull locks on the modules.

Referring to FIG. 23, in another embodiment of our modular expandable irrigation controller the station modules such as 300 are individually locked in their respective receptacles with push-pull spring biased lock mechanisms such as 302 on the modules 300. The lock mechanisms 302 have small knobs 304 with lock members 306 that fit into complementary shaped apertures 308 in a cross-piece 310 of the controller housing.

Figure 24:
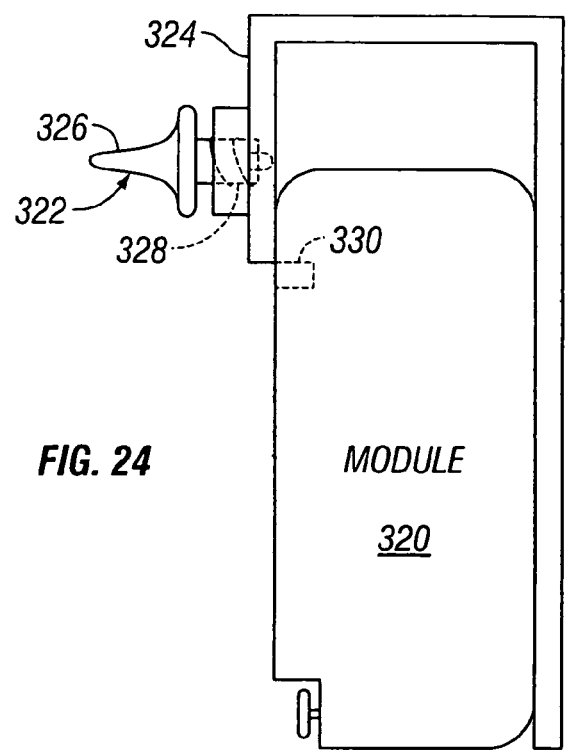
FIG. 24 is a diagrammatic view illustrating an alternate embodiment of a modular expandable irrigation controller in which the station modules are individually locked in their respective receptacles with helical twist locks on the controller housing.

Referring to FIG. 24, in another embodiment of our modular expandable irrigation controller the station modules such as 320 are individually locked in their respective receptacles with helical twist locks such as 322 rotatably mounted on a cross-piece 324 of the controller housing. The locks 322 each have a thumb grip member 326 connected to a helical threaded shaft 328 that screws into a similarly threaded hole 330 formed in the top side of the module 320.

Figure 25:
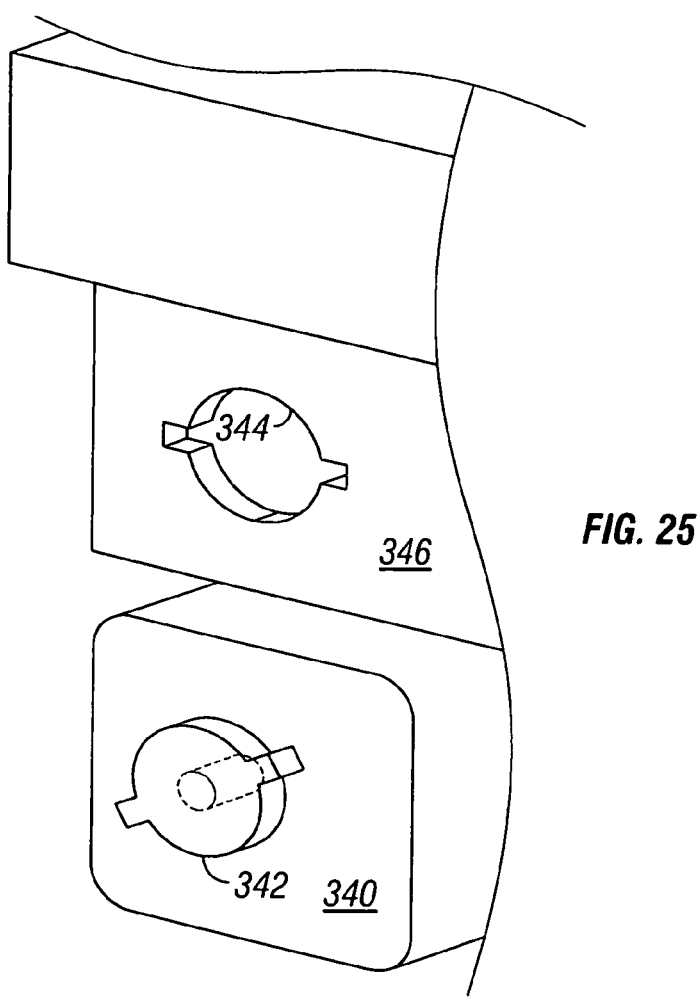
FIG. 25 is a diagrammatic view illustrating an alternate embodiment of a modular expandable irrigation controller in which the station modules are individually locked in their respective receptacles with bayonet locks on the bottom of each module.

Referring to FIG. 25, in another embodiment of our modular expandable irrigation controller the station modules such as 340 are individually locked in their respective receptacles with bayonet locks 342 on the bottom of each module 340. The bayonet locks 342 cooperate in the usual fashion with slotted apertures such as 344 formed in a cross-piece 346 of the controller housing.

Figure 26:
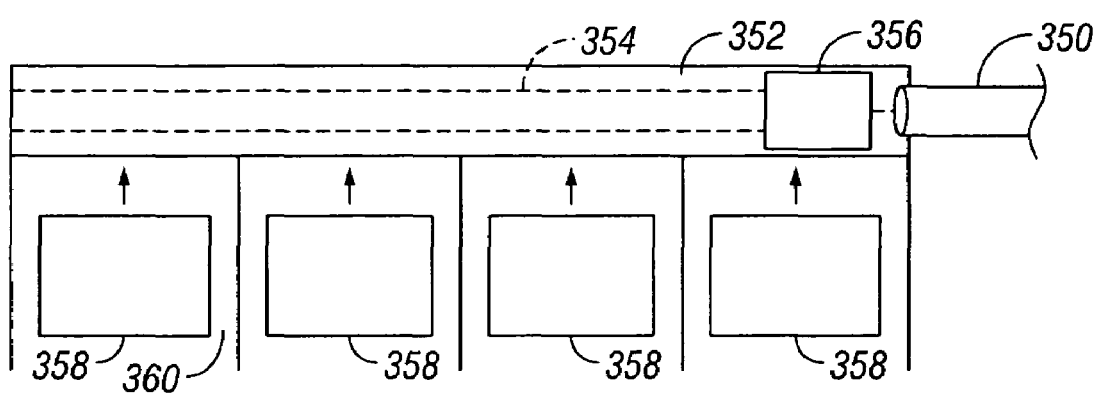
FIG. 26 is a diagrammatic view illustrating an alternate embodiment of a modular expandable irrigation controller in which the station modules are simultaneously locked in their respective receptacles by rotating a single lever mounted on the controller housing.

Finally, referring to FIG. 26, in another embodiment of our modular expandable irrigation controller a single lever 350 is rotatably mounted on a cross-piece 352 of the controller housing and is turned to laterally move a locking member 354 through a drive a linkage 356. Lateral movement of the locking member 354, which has projections (not illustrated), simultaneously locks and unlocks all the modules 358 in their respective receptacles 360 by engaging projections (not illustrated) on the upper sides of the modules 358.

While we have described a number of different embodiments of our modular expandable irrigation controller, it will be apparent to those skilled in the art that our invention can be modified in both arrangement and detail. Therefore, the protection afforded our invention should only be limited in accordance with the following claims.

We claim:

1. A modular expandable irrigation controller, comprising:
   means for entry or selection of a watering program;
   a memory that stores the watering program;
   a processor that executes the stored watering program and controls one or more station modules each including a station module circuit for opening and closing at least one valve in accordance with the watering program;
   a plurality of receptacles configured to removably receive a plurality of corresponding station modules and provide a connection to the processor; and
   a plurality of slide lock mechanisms each including a thumb slide for individually locking each station module in the corresponding receptacle.

2. The controller of claim 1 wherein each slide lock mechanism is mounted on a station module.

3. The controller of claim 1 wherein each slide lock mechanism is mounted on a controller housing.

4. A modular expandable irrigation controller, comprising:
   means for entry or selection of a watering program;
   a memory that stores the watering program;
   a processor that executes the stored watering program and controls one or more station modules each including a station module circuit for opening and closing at least one valve in accordance with the watering program;
   a plurality of receptacles configured to removably receive a plurality of corresponding station modules and provide a connection to the processor; and
   a manually rotatable lock assembly mounted on a controller housing defining the receptacles for locking the modules in the receptacles.

5. The controller of claim 4 wherein the lock assembly includes a plurality of separately rotatable lock mechanisms for individually locking the modules in the receptacles.

6. The controller of claim 4 wherein the lock assembly includes a single rotatable member that may be turned to simultaneously lock all the modules in the receptacles.

* * * * *